UNITED STATES PATENT OFFICE 1,999,185

AZO COMPOUNDS AND THEIR PRODUCTION

Max Engelmann, Wilmington, Del., assignor to E. I. du Pont de Nemours & Company, Wilmington, Del., a corporation of Delaware No Drawing. Application August 17, 1933, Serial No. 685,641

7 Claims. (Cl. 260—96)

This invention relates to carbon compounds and more particularly to substances in which two carbon compound residues are linked by an azo radical. It especially appertains to products obtainable by coupling diazotized amino-trifluoromethyl-benzenes with phenylene di-amines.

The azo radical (—N=N—) is well known in organic chemistry and processes for producing azo compounds, that is, compounds having the formula: R—N=N—R', R and R' standing for the same or different carbon compound radicals, residues, nuclei or groups, are familiar to those skilled in the art and are described in the literature, for example, Textbook of Organic Chemistry by Bernthsen (translation by Sudborough) 1925. Azo compounds have many uses in the field of chemistry, a major use being the dyeing of textile fibers. Some azo compounds are useful as insecticides.

It has now been found that a new series of azo compounds having very valuable properties may be produced by diazotizing meta-amino-phenyl-fluoroform (meta-amino-trifluoromethyl benzene) probably having the formula:

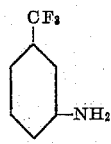

to produce the corresponding diazotized body, probably having the formula:

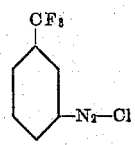

and coupling the same with meta-phenylene-diamine, probably having the formula:

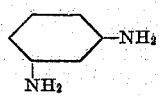

to produce a substance probably having the formula:

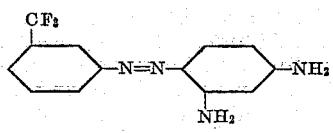

This invention had for an object the preparation of new chemical compounds. Other objects were the preparation of carbon compounds in a very desirable physical form and in a high state of purity. Still further objects were to produce new azo compounds, new derivatives of meta-amino-phenyl-fluoroform, new derivatives of meta-phenylene-diamine and to devise new chemical processes. A general advance in the art and other objects which will appear hereinafter, are also contemplated.

The foregoing objects and related ends are accomplished in the manner set out in the following description in which details of the best mode contemplated for carrying out the invention are disclosed. Specifically, one method for accomplishing the aforementioned objects is to diazotize meta-amino-trifluoromethyl benzene and couple the same with meta-phenylene diamine.

The invention will be further understood by a consideration of the following detailed description and illustrative specific examples, in which the quantities are given in parts by weight.

Example I

In 2000 parts of water 197.5 parts of meta-amino-phenyl-fluoroform-hydrochloride were dissolved and 150 parts of concentrated hydrochloric acid (37–38% HCl) added. The resulting solution was cooled with ice to a temperature of about 5–6° C. and the amine diazotized with 69 parts of sodium nitrite in 400 parts of water. The diazo solution was then poured into a cooled solution of 108 parts of meta-phenylene-diamine in 250 parts of concentrated hydrochloric acid in 3000 parts of water. To the resulting solution, there was slowly added a saturated solution of sodium acetate until the strong Congo (C. I. 370) reaction of hydrochloric acid was changed to the weak reaction of acetic acid. In this particular instance about 800 parts of sodium acetate were required. There resulted a dark-red jelly-like mass which was brought to a temperature of about 40° C. and neutralized with a 10% solution of sodium hydrate. There was produced a product which separated in needle-like yellow crystals, probably having the formula:

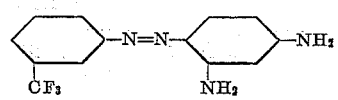

This product (meta-trifluoromethyl-phenyl-azo-meta-phenylene-diamine) was filtered off, washed with water and dried. After recrystallization from ethyl alcohol it was found to melt at 122°–123° C. It is very soluble in organic solvents, for example, acetone, ethyl alcohol, benzene and ether. It is also soluble in strong organic acids for example, acetic acid and lactic acid. It dissolves readily in fatty oils for example, olive and palm oil and in mineral oils for example, petroleum distillation fractions. It is only slightly soluble in water. It dyes cellulose acetate in brilliant yellow shades.

*Example II*

A solution of diazotized meta-amino-phenyl-fluoroform was prepared as described in Example I and added to a cooled solution of 122 parts of meta-toluylene-diamine and 250 parts of 37% hydrochloric acid in 3000 parts of water. To the resulting solution there was added sodium acetate as described in Example I for the purpose of completing the coupling. The resulting red jelly-like mass was neutralized at about 40–45° C. with a diluted solution of sodium carbonate (sodium hydroxide solutions have also been used successfully) to precitate the new azo compounds as a free base. This new compound meta-trifluoromethyl-phenyl-azo-meta-toluylene-diamine probably has the formula:

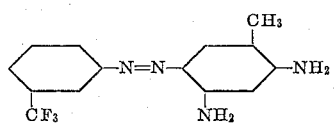

It melts at 137–138° C. It, like the product of Example I, is also very soluble in organic solvents including oils and imparts a yellow to orange color to gasoline and motor benzol. It is only slightly soluble in water. It dyes "acetate-silk" in yellow shades which tend toward orange.

The meta-phenylene-diamine may have other alkyl substituents on the benzene ring, for example, 1-ethyl-2,4-diamino benzene, 1-propyl-2,4-diamino benzene, 1-isopropyl-2,4-diamino benzene, 1-butyl-2,4-diamino benzene, 1-isobutyl-2,4-diamono benzene, 1-secondary-butyl-2,4-diamino benzene, 1-amyl-2,4-diamino benzene, 1-isoamyl-2,4-diamino benzene, 1-hexyl-2,4-diamino benzene, 1-heptyl-2,4-diamino benzene, 1-lauryl-2,4-diamino benzene, 1-palmityl-2,4-diamino benzene, 1-stearyl-2,4-diamino benzene, 1-mellissyl-2,4-diamino benzene, 1-methyl-3,5-diamino benzene, 1-methyl-2,6-diamino benzene, 1,3-dimethyl-2,4-diamino benzene, 1,4-dimethyl-3,5-diamino benzene, 1,2-dimethyl-3,5-diamino benzene and 1,2,4-trimethyl-3,5-diamino benzene.

*Example III*

A solution of diazotized meta-amino-tri-fluoromethyl-benzene was prepared as described in Example I and added to a cooled solution of 138 parts of 2,4-diamino-anisole and 250 parts of concentrated hydrochloric acid in 5000 parts of water. Coupling and separation of the new azo body was carried out as described in Examples I and II. The resultant product was probably meta-trifluoromethyl-phenyl-azo-2,4-di-amino-anisole having the formula:

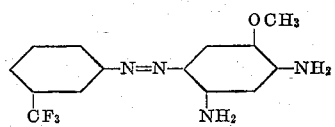

Upon recrystallization from ethyl alcohol, it was found to have a melting point of 141–142° C. It is only slightly soluble in water but easily soluble in organic solvents. It is a red colored product which dyes wool in orange shades. Cellulose esters and ethers are also dyed orange shades.

Similar products are produced by coupling the diazotized meta-amino-fluoroform with such other meta-phenylene-diamines as 1-ethoxy-2,4-diamino benzene, 1-propyloxy-2,4-diamino benzene, 1-isopropyloxy-2,4-diamino benzene, 1-butyloxy-2,4-diamino benzene, 1-isobutyloxy-2,4-diamino benzene, 1-secondary-butyloxy-2,4-diamino benzene, 1-amyloxy-2,4-diamino benzene, 1-isoamyloxy-2,4-diamino benzene, 1-hexyloxy-2,4-diamino benzene, 1-heptyloxy-2,4-diamino benzene, 1-lauryloxy-2,4-diamino benzene, 1-palmityloxy-2,4-diamino benzene, 1-stearyloxy-2,4-diamino benzene, 1-mellissyl-oxy-2,4-diamino benzene, 1-methoxy-3,5-diamino benzene, 1-methoxy-2,6-diamino benzene, 1,3-dimethoxy-2,4-diamino benzene, 1,4-dimethoxy-3,5-diamino benzene, 1,2-dimethoxy-3,5-diamino benzene and 1,2,4-trimethoxy-3,5-diamino benzene.

*Exampe IV*

A solution of diazotized meta-amino-phenyl-fluoroform was prepared according to Example I and added to a cooled solution of 122 parts of meta-amino-di-methyl-aniline and 150 parts of concentrated hydrochloric acid in 5000 parts of water. The coupling was performed by the addition of sodium acetate as described in Example II. The separation of the new product was carried out as described in Examples I and II. The product which was a very reddish-orange powder dyes wool and silk in yellow to orange shades. It melted, after purification by recrystallization from ethyl alcohol, at 149–150° C. It is soluble in organic solvents but only slightly soluble in water.

Other meta-phenylene-diamines having either or both of the amino groups alkylated may be used in preparing compounds belonging to the series herein described satisfactorily. Among these other products there may be mentioned meta - amino - monomethyl - aniline, meta - dimethyl-amino-benzene, meta - N - dimethyl-N'-methyl-phenylene diamine, meta-N,N,N',N'-tetra-methyl-phenylene-diamine, meta - amino-monoethyl - aniline, meta - amino-monopropyl-aniline, meta-amino - isopropyl - aniline, meta-amino-monolauryl-aniline, meta - N,N - methyl-ethyl-N',N'-propyl-butyl-phenylene-diamine.

As will be apparent to those skilled in the art, the coupling may also be carried out in alkaline or practically neutral solutions for instance in the presence of carbonates or bicarbonates. The product when desired may be purified by recrystallization from benzene and the like.

The catholicity of the invention is apparent from the preceding description and specific examples. In some cases the ortho-diamines may replace the meta-diamines with satisfactory results. The fluoroform group (trifluoromethyl) radical may be para or ortho to the amino group on the benzene ring if found desirable. The invention is not limited to the specific compounds set out in the above examples. Satisfactory results may be obtained with alkyl-alkoxy-meta-phenylene diamines, for example, 1-methoxy-3-methyl-2,4-diamino benzene, 1-methyl-3-methoxy - 2,4 - diamino benzene, 1 - methoxy-4,5-dimethyl-2,6-diamino benzene, 1-methyl-3,5-dimethoxy-2,4-diamino benzene, N¹-methyl-amino-2,5-dimethyl-6-methoxy - meta-phenylene-diamine, N¹-methyl-amino-2,6-dimethoxy-5-methyl-N³-methyl-amino-meta - phenylene - diamine, N¹-dimethyl - amino - 5,6 - dimethoxy-2-methyl - meta-phenylene-diamine, N¹-dimethyl - amino- 5,6-dimethoxy-2-methyl-meta-phenylene-diamine, $N^1$-dimethyl-$N^3$-dimethyl-2,6-dimethyl-5-methoxy-meta-phenylene-diamine.

Since the new azo compounds have amino groups they readily form acid salts for example, the hydrobromide, the hydrochloride, the sulfate, the nitrate and the phosphate. These salts are water soluble.

These new azo bodies are of a basic character and can therefore be applied to acidic fibers in the usual and well known ways. In particular they are dyes for cellulose acetate (acele, cela-nylene-diamine which products dye cellulose esters.

3. The azo compounds which may be produced by diazotizing a meta-amino-trifluoromethyl-benzene and coupling the same with an alkyl meta-phenylene diamine.

4. Meta-trifluoromethyl-phenyl-azo-2,4-diamino-benzene which is a yellow solid at ordinary temperatures, which has a melting point of 122°–123° C., which is soluble in acetone, ethyl alcohol, benzene, ether, acetic acid, lactic acid and olive oil, which dyes cellulose acetate in yellow